US012391520B2

(12) United States Patent
Cambruzzi et al.

(10) Patent No.: US 12,391,520 B2
(45) Date of Patent: Aug. 19, 2025

(54) MOUNTING FRAME FOR DISPLACING AND FIXING IN A SHAFT

(71) Applicant: Inventio AG, Hergiswil (CH)

(72) Inventors: Andrea Cambruzzi, Zurich (CH); Oliver Simmonds, Lucerne (CH); Philipp Zimmerli, Harkingen (CH)

( * ) Notice: Subject to any disclaimer, the term of this patent is extended or adjusted under 35 U.S.C. 154(b) by 764 days.

(21) Appl. No.: 17/755,674

(22) PCT Filed: Nov. 3, 2020

(86) PCT No.: PCT/EP2020/080814
§ 371 (c)(1),
(2) Date: May 5, 2022

(87) PCT Pub. No.: WO2021/094138
PCT Pub. Date: May 20, 2021

(65) Prior Publication Data

US 2022/0380177 A1 Dec. 1, 2022

(30) Foreign Application Priority Data

Nov. 12, 2019 (EP) ..................................... 19208548

(51) Int. Cl.
*B66B 7/02* (2006.01)
*B66B 5/00* (2006.01)
*B66B 19/00* (2006.01)

(52) U.S. Cl.
CPC ............ *B66B 5/0087* (2013.01); *B66B 19/00* (2013.01)

(58) Field of Classification Search
CPC ........ B66B 19/00; B66B 11/0005; B66B 7/24
See application file for complete search history.

(56) References Cited

U.S. PATENT DOCUMENTS 10,836,610 B2 * 11/2020 Cambruzzi ............. B66B 7/024
11,767,196 B2 * 9/2023 Cambruzzi ........... B66B 19/002 187/408

(Continued)

FOREIGN PATENT DOCUMENTS

CN 105358468 A 2/2016
CN 107013030 A 8/2017

(Continued)

OTHER PUBLICATIONS

Zhiqiang Liu, Research on Sinking Technology and Equipment of Shaft Boring Machine, China Mining Magazine, May 2017, pp. 137-141 and 172, vol. 26, No. 5, China Academic Journal Electronic Publishing House, China.

*Primary Examiner* — Michael A Riegelman
(74) *Attorney, Agent, or Firm* — Schlee IP International, PC; Alexander R. Schlee; Pascal A. Schlee

(57) ABSTRACT

A mounting frame for displacing and fixing in a shaft includes a support component for support against a first shaft wall during displacement in the shaft and is arranged on a main frame so as to be at least partially movable in a fixing direction relative to the main frame. The support component can assume a fixing position and a displacement position, with no part of a support surface being spaced further outward in the fixing direction, i.e. toward the first shaft wall, from the main frame in the fixing position than a fixing surface of a primary fixing component that is used to fix the mounting frame in the shaft, and the support surface is spaced further outward from the main frame in the fixing direction in the displacement position than the fixing surface.

13 Claims, 3 Drawing Sheets

(56) References Cited

U.S. PATENT DOCUMENTS

| | | | | |
|---|---|---|---|---|
| 2012/0006621 | A1* | 1/2012 | Casanova | E04G 1/22<br>182/141 |
| 2012/0217101 | A1* | 8/2012 | Peacock | B66B 19/00<br>29/428 |
| 2012/0291395 | A1* | 11/2012 | Plathin | B66B 19/02<br>52/741.1 |
| 2014/0000987 | A1* | 1/2014 | Peacock | B66B 9/187<br>187/414 |
| 2018/0208438 | A1* | 7/2018 | Cambruzzi | B66B 7/024 |
| 2018/0208439 | A1* | 7/2018 | Studer | B66B 7/024 |
| 2019/0276277 | A1* | 9/2019 | Christen | B66B 19/00 |
| 2020/0055709 | A1* | 2/2020 | Cambruzzi | G01B 5/25 |
| 2020/0180912 | A1* | 6/2020 | Li | B66B 11/0446 |
| 2020/0277158 | A1* | 9/2020 | Christen | B66B 5/284 |
| 2020/0299105 | A1* | 9/2020 | Cambruzzi | B66B 19/00 |
| 2020/0377339 | A1* | 12/2020 | Cambruzzi | G01C 15/004 |
| 2021/0130136 | A1* | 5/2021 | Cambruzzi | B66B 19/00 |
| 2021/0139286 | A1* | 5/2021 | Cambruzzi | B66B 19/002 |
| 2021/0156666 | A1* | 5/2021 | Cambruzzi | B66B 19/00 |
| 2021/0300729 | A1* | 9/2021 | Cambruzzi | B66B 19/00 |
| 2021/0323793 | A1* | 10/2021 | Cambruzzi | B66B 19/00 |
| 2022/0009006 | A1* | 1/2022 | Cambruzzi | G05B 19/402 |
| 2022/0380177 | A1* | 12/2022 | Cambruzzi | B66B 19/00 |
| 2022/0380178 | A1* | 12/2022 | Cambruzzi | B66B 7/024 |
| 2023/0041465 | A1* | 2/2023 | Cambruzzi | B66B 19/00 |
| 2023/0049422 | A1* | 2/2023 | Achermann | B62B 3/02 |

FOREIGN PATENT DOCUMENTS

| | | | | |
|---|---|---|---|---|
| CN | 108883909 | A | 11/2018 | |
| CN | 110306776 | A * | 10/2019 | E04G 3/246 |
| CN | 110382395 | A | 10/2019 | |
| DE | 102018203156 | A1 | 9/2019 | |
| FR | 2624491 | A1 | 6/1989 | |
| WO | 2017016780 | A1 | 2/2017 | |
| WO | 2018162350 | A1 | 9/2018 | |

* cited by examiner

MOUNTING FRAME FOR DISPLACING AND FIXING IN A SHAFT

FIELD

The invention relates to a mounting frame for displacing and fixing in a shaft to provide a working region for carrying out work in the shaft.

BACKGROUND

WO 2017/016780 A1 describes a mounting frame for displacing and fixing in a shaft in the form of a carrier component for displacing and fixing in an elevator shaft of an elevator installation. The mounting frame has a main frame in the form of a rack. A plurality of support components in the form of support rollers are arranged on a first side of the main frame, via which rollers the mounting frame is supported against a first shaft wall of the elevator shaft during displacement in a displacement direction, and thus in the vertical direction. Primary fixing components in the form of extendable rams are also arranged on the first side of the main frame, by means of which rams the mounting frame is supported against the first shaft wall during fixing. On a second side of the main frame that is opposite the first side of the main frame in a fixing direction, and thus in a horizontal direction, there is a secondary fixing component with an immovable contact part that is elongate in the displacement direction. The mounting frame can be supported during fixing via the contact part against a second shaft wall that is opposite the first shaft wall in the fixing direction.

In order to fix the mounting frame in the shaft, the primary fixing components in the form of the extendable rams are extended, i.e. displaced away from the main frame toward the first shaft wall. The rams must first be extended beyond the support components in the form of the support rollers until they come into contact with the first shaft wall. Since there must be a spacing between the contact part of the secondary fixing component and the second shaft wall in order to displace the mounting frame in the shaft, after the ram first makes contact with the shaft wall, the rams must be extended further in order to displace the main frame with the secondary fixing component toward the second shaft wall. As soon as the contact part of the secondary fixing component is pressed securely against the second shaft wall, the mounting frame is secured or braced in the shaft and thus fixed.

The procedure described for fixing the mounting frame in the shaft results in the main frame being at a comparatively large spacing from the first shaft wall when the mounting frame is in the fixed state. If work then needs to be carried out in the region of the mounting frame, in particular in the form of installation steps in the shaft, whether manually by a mechanic or by a mechatronic installation component as described in WO 2017/016780 A1, the main frame can thus restrict a possible working region when the mounting frame is in the fixed state.

SUMMARY

In contrast, an aim of the invention is in particular that of proposing a mounting frame for displacing and fixing in a shaft, which, in the fixed state, enables the largest possible working region for carrying out work in the shaft. This problem is solved according to the invention by a mounting frame having the features explained below.

The mounting frame according to the invention for displacing and fixing in a shaft has a main frame and a support component having a support surface for supporting the mounting frame via the support surface against a first shaft wall of the shaft when the mounting frame is moved in a displacement direction. The mounting frame also has a primary fixing component having a fixing surface for supporting the mounting frame via the fixing surface against the first shaft wall when the mounting frame is fixed in the shaft, and a secondary fixing component having a contact part for supporting the mounting frame via the contact part against a second shaft wall of the shaft that is opposite the first shaft wall in a fixing direction when the mounting frame is fixed in the shaft. The support component and the primary fixing component are arranged on a first side of the main frame and the secondary fixing component is arranged on a second side of the main frame that is opposite the first side in the fixing direction.

According to the invention, the primary fixing component is arranged on the main frame so as to be immovable relative to the main frame. In addition, the contact part of the secondary fixing component is arranged on the main frame so as to be movable in the fixing direction relative to the main frame and can assume a fixing position and a displacement position, the contact part being spaced further outward in the fixing direction—i.e. toward the second shaft wall—from the main frame in the fixing position than in the displacement position. Moreover, the support component is arranged on the main frame so as to be at least partially movable relative to the main frame in the fixing direction and can assume a fixing position and a displacement position. No part of the support surface is spaced further outward in the fixing direction—i.e. toward the first shaft wall—from the main frame in the fixing position than the fixing surface of the primary fixing component, and the support surface is spaced further outward in the fixing direction—i.e. toward the first shaft wall—from the main frame in the displacement position than the fixing surface.

In other words, when the mounting frame is displaced in the displacement direction in the shaft, the support component that can be displaced in the fixing direction protrudes at least partially beyond the primary fixing component toward the first shaft wall, so that the mounting frame can be supported against the first shaft wall via the support surface of the support component during displacement. The support component is thus in the displacement position during displacement of the mounting frame. When the mounting frame is fixed in the shaft by extending the contact part of the secondary fixing component toward the second shaft wall, the main frame is displaced toward the first shaft wall and the support component recedes so far toward the main frame that, in the fixing position of the support component that is then reached, the fixing surface of the primary fixing component can make contact with the first shaft wall and the mounting frame is thus secured or braced via the contact part of the secondary fixing component and the primary fixing component between the first and second shaft wall. This results in the first side of the main frame being at a very small spacing from the first shaft wall when the mounting frame is in the fixed state, and thus only minimally restricting a working region in the region of the mounting frame. The mounting frame according to the invention thus enables a particularly large working space for work in the shaft in the region of the mounting frame.

The mounting frame can be used to hold a mechatronic installation component, for example in the form of an industrial robot. Using the mechatronic installation component, automated mounting steps can be carried out in the shaft when the mounting frame is in the fixed state. The mechatronic installation component can, for example, be designed according to the automated installation component of WO 2017/016780 A1. However, the mounting frame can, for example, also carry an installation platform or be designed as an installation platform from which a mechanic can carry out mounting steps by hand or with the aid of tools in the shaft.

A shaft is to be understood here as an elongate space delimited by shaft walls. In particular, the shaft has a mainly rectangular cross-section, although other cross-sections are also conceivable. In particular, the shaft extends in a mainly vertical direction; the displacement direction therefore also extends mainly in the vertical direction and the fixing direction accordingly extends mainly in the horizontal direction. The shaft is arranged in particular in a building, although it can also be arranged in a bridge, a pillar, or on a ship, for example. The shaft walls consist in particular of concrete strengthened with reinforcements. However, they can also be made of metal, for example. The shaft is used in particular as an elevator shaft of an elevator installation, in which, during operation of the elevator installation, a car for transporting people and/or objects is displaced in the displacement direction. The shaft can also serve other purposes; for example it can be used as a ventilation shaft or to house pipes, electric cables, or the like.

The mounting frame can be displaced within the shaft in the displacement direction and can thus be positioned at different points, in particular at different heights within the shaft. For this purpose, the mounting frame is suspended from a displacement component, in particular in the form of a winch, in particular via a carrier means, for example in the form of a cable, a chain, or a belt. The carrier means can be wound up or down by the winch and the mounting frame can thus be displaced in the shaft. In particular, the carrier means has an angle of incline relative to the vertical toward the first shaft wall. It can thus be ensured that the mounting frame is actually supported against the first shaft wall via the support component during displacement and that it does not hang freely in the shaft, which could cause it to hit a shaft wall and thus result in damage to the mounting frame and the shaft wall. In particular, the mounting frame has a compensating element which counteracts tilting of the mounting frame toward the first shaft wall during displacement. The compensating element is designed in particular in accordance with a compensating element in WO 2018/162350 A1.

The main frame can, for example be designed as a simple platform, frame, scaffolding, car, or the like. It is in particular made of metal, for example metal profiles.

The support component in particular has a roller which can roll along the first shaft wall in the displacement direction. A resting surface of the roller on the shaft wall then forms the support surface of the support component. The roller can also be designed to be pivotable about a pivot axis perpendicular to the first shaft wall, so that it is also possible to roll transversely to the displacement direction along the first shaft wall. The support component can, for example, also have a sliding element, for example a cuboid made of ceramic. In this case, the sliding element can slide on its support surface along the first shaft wall. In particular, the mounting frame has a plurality of, specifically four, support components. These are arranged in particular in such a way that they form the corners of a rectangle whose edges extend in the displacement direction and in a transverse direction perpendicular to the displacement direction and to the fixing direction.

The support component is arranged on the main frame so as to be at least partially movable relative to the main frame in the fixing direction. This means that it is fixed, for example screwed, directly or indirectly to the main frame, and at least some parts of the support component are movable relative to the main frame. If the support component has a roller, an axle about which the roller can rotate when rolling on the shaft wall is in particular provided, and the roller is therefore arranged so as to be movable relative to the main frame in the fixing direction. The axle can be arranged, for example, on a holder that is securely fixed to the main frame so that it can be moved in the fixing direction. If the support component has a sliding element the aforementioned cuboid can be arranged on a holder that is securely fixed to the main frame so that it can be moved in the fixing direction, for example. The support component is in particular designed and arranged in such a way that it is also in contact with the first shaft wall via the support surface when the mounting frame is in the fixed state—i.e. in its fixing position.

The primary fixing component is arranged on the main frame so as to be immovable relative to the main frame. This means that it is fixed, for example screwed, directly or indirectly to the main frame without the possibility of movement. “Arranged so as to be immovable” should be understood here to mean that it can only move minimally, if at all, relative to the main frame. A deformation of the primary fixing component is in particular not a movement of the primary fixing component relative to the main frame. The primary fixing component is then arranged on the main frame so as to be immovable at least when the mounting frame is used, i.e. displaced or fixed, for example, in the shaft. It is possible for the position of the primary fixing component relative to the main frame to be changed in preparation for transport of the mounting frame.

The fixing surface of the primary fixing component is formed in particular by a rubber buffer. The rubber buffer is screwed to the main frame via a metal holder, for example. In particular, the mounting frame has a plurality of, specifically four, primary fixing components. In particular, exactly one primary fixing component is assigned to each support component. These fixing components are arranged in particular analogously to the displacement components, so that they form the corners of a rectangle of which the edges extend in the displacement direction and in a transverse direction perpendicular to the displacement direction and to the fixing direction.

The secondary fixing component has at least one controllable actuator, for example in the form of an electric spindle drive or a hydraulic or pneumatic piston-cylinder unit by means of which the contact part can be displaced outward, i.e. away from the main frame toward the second shaft wall. The actuator and associated parts of the secondary fixing device are fixed, for example screwed, to the main frame so as to be immovable. The second fixing component can also have more than one contact part. It is also possible for the mounting frame to have more than one secondary fixing component, each with at least one contact part. The actuator is controlled by a control device, which in particular can also perform other tasks, such as controlling the displacement component or any mechatronic installation component.

In an embodiment of the invention, the mounting frame has an energy store which is designed and arranged in such a way that it pushes the support component toward the displacement position. This means that the energy store exerts a force on the support component, which brings the support component into the displacement position as far as possible. There is therefore no need for a controllable actuator to change the position of the support component. The mounting frame is thus designed in a particularly simple and inexpensive manner. The energy store can also be viewed as part of the support component.

The energy store is designed, for example, as a spring, in particular a helical spring. The spring is supported at least indirectly on the main frame on one side and on a part of the support component that is movable relative to the main frame, i.e. on an axle of a roller, for example, on the other side. The spring is biased in such a way that it pushes the support component into the support position, i.e. in particular pushes the roller far enough away from the main frame that it protrudes at least partially beyond the primary fixing component toward the first shaft wall. The energy store is designed in such a way that it can hold the support component in the displacement position during displacement in the shaft and can be brought from the displacement position to the fixing position by extending the contact part of the secondary fixing component by means of the actuator and thus displacing the main frame toward the first shaft wall. The energy store can therefore counteract a supporting force that occurs during displacement in the shaft, but can be overpowered by the actuator of the secondary fixing component.

However, it is also conceivable for a controllable actuator to be provided for changing the position of the support component instead of the energy store.

In an embodiment of the invention, the main frame is multi-part and two parts of the main frame are designed to be movable relative to one another in the fixing direction. An extension of the main frame can thus be changed in the fixing direction and thus adapted to the dimensions of the shaft. The mounting frame can therefore be used in shafts with different designs and is therefore particularly flexible.

The two parts are made movable relative to one another in particular by making it possible for the first part to be pushed into the second part to different extents and secured in the desired position, for example with a bolt. For this purpose, the two parts are designed, for example, as metal profiles, with an inner contour of the second part being adapted to an outer contour of the first part in such a way that it can accommodate the first part. The metal profiles can have a rectangular or round cross-section, for example. The adaptation of the main frame, i.e. the moving of the aforementioned parts of the main frame relative to one another, is carried out in particular by hand and therefore without actuators. The adaptation takes place in particular in a preparatory phase before the mounting frame is displaced in the shaft for the first time.

In an embodiment of the invention, a suspension device for suspending the mounting device from a carrier means is arranged on the main frame. The suspension device is designed to be movable in the fixing direction. In this way, an optimal suspension of the mounting frame can always be achieved even with different configurations of the mounting frame, for example due to adjustments to differently designed shafts. In particular, the suspension device can be adjusted in such a way that the center of gravity of the mounting frame or the mounting device is arranged precisely below the suspension device.

The suspension device can, for example, be moved by hand by a mechanic, in particular outside the shaft. It is also possible for a controllable actuator, for example in the form of an electric spindle drive or a hydraulic or pneumatic piston-cylinder unit, by means of which the movement can be carried out, to be arranged on the main frame. An inclination sensor can then also be arranged on the main frame, for example, by means of which sensor the inclination of the main frame relative to the horizontal can be measured. The actuator can then be controlled by a control device in such a way that the main frame is not inclined relative to the horizontal.

The suspension device can be designed e.g. as a tab or a bail made of metal and having a through-opening, for example. The suspension device can be fixed at different points on the main frame with respect to the fixing direction, for example, and is therefore designed to be movable relative to the main frame in the fixing direction.

In an embodiment of the invention, the mounting frame has two support components and two primary fixing components, which are each arranged spaced apart from one another in the displacement direction. The primary fixing components are arranged on the outside in the displacement direction relative to the support components. This enables a particularly stable support when fixing the mounting frame. As already explained above, the mounting frame has in particular four primary fixing components and an associated support component for each primary fixing component. In particular, the primary fixing components and the support components are arranged such that they each form corners of a rectangle of which the edges extend in the displacement direction and in a transverse direction perpendicular to the displacement direction and to the fixing direction.

In an embodiment of the invention, a stabilizing element is arranged on the first side of the main frame, by means of which stabilizing element the mounting frame can be supported against the first shaft wall at least in the fixing position of the support component. This advantageously ensures that the main frame does not deform so easily when force is applied, without the entire main frame having to be made very rigid. A rigid design would require both increased weight and complexity and therefore expensive production of the main frame. It is also possible for more than one stabilizing element to be arranged on the main frame. The stabilizing element can have a roller or a rubber element, for example, which can be supported against the first shaft wall.

In an embodiment of the invention, the main frame has a longitudinal beam extending in the displacement direction, on which beam the stabilizing element is arranged. A longitudinal beam extending in the displacement direction and thus perpendicular to the fixing direction is particularly susceptible to deformation when force is applied. Providing the stabilizing element on a longitudinal beam is therefore particularly effective.

The stabilizing element is arranged in particular on an end of the longitudinal bar that is oriented toward the shaft floor, where it acts particularly effectively against deformations of the longitudinal beam. At the end, beams are in particular arranged which project into the shaft and which, when the mounting frame is used in the shaft, can carry magazines with mounting material, such as screws or anchor bolts. When picking up the mounting material, for example with a mechatronic installation component, forces can act toward the first shaft wall on the beam and thus on the longitudinal bar, which can be supported via the stabilizing element against the first shaft wall.

In an embodiment of the invention, the stabilizing element has a roller which is pushed away from the main frame toward the first shaft wall by means of an energy store, in particular in the form of a spring. The stabilizing element also has a controllable fixing element by means of which the roller can be fixed in a position relative to the main frame. This enables a particularly simple and cost-effective design of the stabilizing element.

In this way, the roller can roll on the first shaft wall while the mounting frame is being displaced. When the mounting frame is fixed in the shaft, the contact part of the secondary fixing component and the support component are brought into their fixing positions, and the roller then is pushed against the spring toward the main frame. When the main frame is fixed, the roller with the fixing element is held in place relative to the main frame, so that the main frame, in particular in the form of the aforementioned longitudinal beam, cannot swerve toward the first shaft wall.

The fixing element is designed, for example, as a so-called pneumatic brake which exerts a holding force on a component when compressed air is applied. In addition, other fixing elements, for example electrically or hydraulically actuated fixing elements, are also possible.

It is also possible for the stabilizing element to have an actuator, for example in the form of an electric spindle drive or a hydraulic or pneumatic piston-cylinder unit, by means of which a component of the stabilizing element can be displaced against the first shaft wall.

In an embodiment of the invention, the contact part of the secondary fixing component has a shape that is elongate in the displacement direction. This enables support against the second shaft wall, even if the wall has openings, for example a door opening in an elevator shaft. In particular in the displacement direction, the contact part has an extension so great that it is greater than a maximum extension of an opening in the second shaft wall. The contact part has in particular a mainly bar-shaped basic shape.

The contact part is in particular multi-part. This means that at least part of the contact part can be easily dismounted and mounted. In particular, the extension of the contact part in the displacement direction changes as a result of the aforementioned mounting and dismounting. The aforementioned part can thus be dismounted for transporting the mounting frame, as a result of which the mounting frame can be easily transported. In addition, the contact part can be adapted to shafts of different designs, in particular to different heights of door openings, by selecting the mounted part accordingly. In particular, the contact part is designed in such a way that it can only be assembled after the mounting frame has been introduced into the shaft. This can be done, for example, by a mechanic who has access to the shaft and thus to the mounting frame via a door opening.

The contact part consists in particular of three parts, with a middle piece being securely connected to the remaining parts of the secondary fixing component. An end piece can be dismounted and remounted at the top and bottom of the middle piece. It is also possible for the middle piece to be dismounted.

In an embodiment of the invention, the secondary fixing component has an actuator, already described above, which can move the contact part from the fixing position to the displacement position and vice versa. The secondary fixing component is designed in such a way that a spacing between the contact part and the main frame in the fixing direction can also be changed independently of the actuator of the secondary fixing component. In this way, the main frame can be positioned at a desired position in the fixing direction in the shaft when the mounting frame is in the fixed state. This is particularly advantageous for a mechatronic installation component to be arranged on the main frame. This can thus also be positioned at a desired position in the fixing direction in the shaft. It can thus be positioned in particular in such a way that it can carry out all the mounting steps provided, and in particular can reach the locations on the shaft walls that are necessary for this. In the fixed state of the mounting frame, the main frame should be positioned, for example, in such a way that the mechatronic installation component is arranged centrally in the shaft in the fixing direction. The alignment in the horizontal direction transverse to the fixing direction can be set by appropriately positioning the mounting frame in the shaft during the preparatory phase mentioned above.

For this purpose, the contact part of the secondary fixing component is connected to the aforementioned actuator in particular via two parts, which are designed to be movable with respect to one another in the fixing direction. The design of the mentioned parts in which they are movable relative to one another can be achieved with movable parts of the main frame analogous to the movable parts described above.

The mounting frame described can be used particularly advantageously as part of a mounting device for carrying out automated mounting steps in a shaft. The mounting device also has a mechatronic installation component, as already described above.

The mounting device described can be used particularly advantageously as part of a mounting system for carrying out automated mounting steps in a shaft. The mounting system also has a displacement component for displacing the mounting device in the shaft, as has already been described above.

Further advantages, features, and details of the invention can be found in the following description of embodiments and with reference to the drawings, in which identical or functionally identical elements are provided with identical reference signs. The drawings are merely schematic and are not to scale.

DETAILED DESCRIPTION

Figure 1:
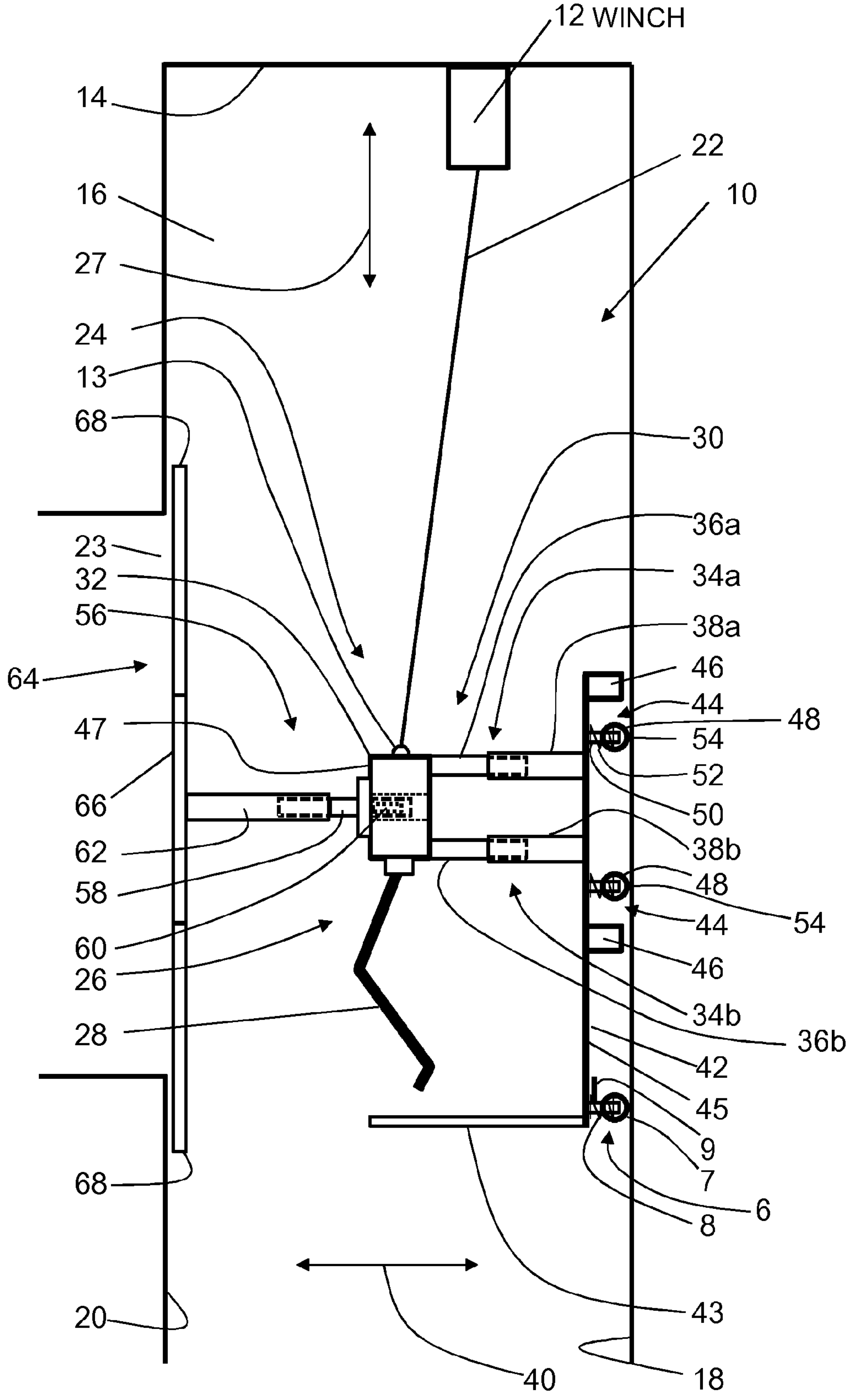
FIG. 1 shows a mounting system in a shaft having a mounting frame with a support component in a displacement position and a contact part of a secondary fixing component in a displacement position in a side view.
Figure 2:
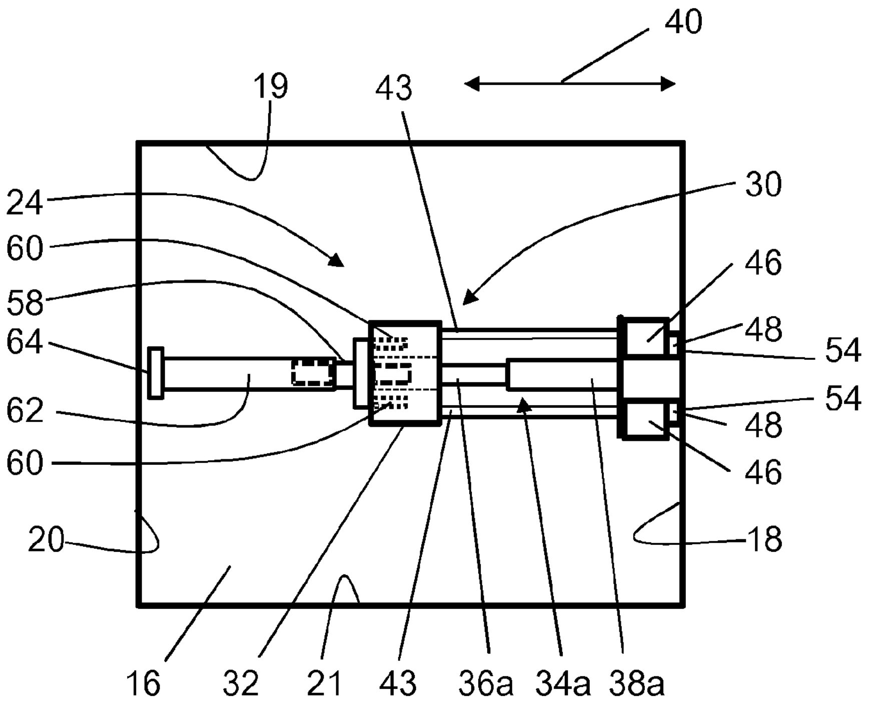
FIG. 2 shows a mounting device of the mounting system from FIG. 1 in a view from above.

FIGS. 1 and 2 will be discussed first. According to FIG. 1, a mounting system 10 for carrying out automated mounting steps has a displacement component in the form of a winch 12, which is arranged on a shaft ceiling 14 of a shaft in the form of an elevator shaft 16. The elevator shaft 16 is delimited by a total of four shaft walls, of which only a first shaft wall 18 and a second shaft wall 20 located opposite the first shaft wall in a fixing direction 40 are shown in FIG. 1. FIG. 2 also shows a third shaft wall 19 and a fourth shaft wall 21 located opposite the third shaft wall 19. According to FIG. 2, the elevator shaft 16 has a mainly rectangular cross-section and extends mainly in the vertical direction, being delimited at the top by the shaft ceiling 14. A shaft floor opposite the shaft ceiling 14 is not shown. The second shaft wall 20 has an opening in the form of a door opening 23 into which a shaft door is inserted when an elevator installation is installed in the elevator shaft 16.

The winch 12 is connected to a mounting frame 24 of a mounting device 26 for carrying out automated mounting steps in the elevator shaft 16 via a carrier means in the form of a cable 22. For this purpose, the mounting frame 24 is suspended on the cable 22 via a suspension device 13 in the form of a bail. The cable 22 can be wound up or unwound by the winch 12 and the mounting frame 24 and thus the mounting device 26 can therefore be displaced in the elevator shaft 16, i.e. pulled up and let down. The mounting frame 24 and thus the mounting device 26 can therefore be displaced in a vertically extending displacement direction 27 in the elevator shaft 16. A mechatronic installation component in the form of an industrial robot 28 is arranged on the mounting frame 24, by means of which component automated mounting steps can be carried out in the elevator shaft 16. The industrial robot 28 is designed, for example, like an industrial robot described in WO 2017/016780 A1 and can, for example, automatically carry out the mounting steps described therein.

The mounting frame 24 and the industrial robot 28 thus form the mounting device 26 for carrying out automated mounting steps. The mounting device 26, the cable 22, and the winch 12 thus form the mounting system 10 for carrying out automated mounting steps.

The mounting frame 24 has a multi-part main frame 30. The main frame 30 has a mainly cuboid middle part 32 on which the industrial robot 28 is arranged so as to hang downward. The suspension device 13 mentioned above is arranged on the middle part 32 and thus on the main frame 30 at the top toward the shaft ceiling 14. The suspension device 13 can be fixed at different points on the middle part 32 with respect to the fixing direction 40 and is therefore designed to be movable relative to the main frame 30 in the fixing direction 40. The middle part 32 can accommodate other components (not shown) of the mounting device 26 or of the mounting frame 24, such as a control device and/or a compressor for providing compressed air. The middle part 32 can be closed off from the outside by a housing (not shown). A side of the middle part 32 oriented toward the second shaft wall 20 forms a second side 47 of the main frame 30.

The middle part 24 is adjoined by two horizontally extending transverse bars 34*a* and 34*b* which are spaced apart from one another in the displacement direction 27. The transverse bars 34*a*, 34*b* are constructed in two parts, with a first part 36*a*, 36*b* arranged toward the middle part 32 being able to be pushed into a second part 38*a*, 38*b* arranged toward the first shaft wall 18. The two parts 36*a* and 38*a* or 36*b* and 38*b* can be secured relative to one another by means of a bolt (not shown). The extension of the main frame 30 in the fixing direction 40, which extends horizontally and perpendicularly to the first shaft wall 18 and to the second shaft wall 20, can thus be changed.

The two transverse bars 34*a*, 34*b* are connected toward the first shaft wall 18 to a longitudinal bar 42 extending in the displacement direction 27. The longitudinal bar 42 forms a first side 45 of the main frame 30. At the lower end of the longitudinal bar 42, there are two horizontal beams 43 which protrude into the elevator shaft 16 and which, when the mounting device 26 is in operation, can carry one or more magazines with mounting material, such as screws or anchor bolts. The main frame 30 is thus made up of the middle part 32, the two transverse bars 34*a*, 34*b*, the longitudinal bar 42, and the beams 43. The aforementioned parts of the main frame 30 are connected to one another in a suitable manner, for example plugged, screwed, or welded. They are each made of suitable metal profiles, for example.

A total of four pairs consisting of a support component 44 and a primary fixing component 46 are arranged on the longitudinal bar 42 toward the first shaft wall 18. The support components 44 and the primary fixing components 46 are arranged in such a way that they each form the corners of a rectangle of which the edges extend in the displacement direction 27 and in a transverse direction perpendicular to the displacement direction 27 and to the fixing direction 40, with the primary fixing components 46 being arranged further to the outside in the displacement direction 27 relative to the support components 44.

The primary fixing components 46 are designed as rubber buffers, which are arranged on the longitudinal bar 42 so as to be immovable relative to the bar. They are therefore also arranged on the main frame 30 so as to be immovable relative to the main frame. Each support element 44 has a roller 48 which can be rotated about an axle (not shown) and which can roll along the first shaft wall 18 in the displacement direction 27. The axle of the roller 48 is fastened to the longitudinal bar 42 via a holder 50 so as to be movable in the fixing direction 40. For this purpose, the holder 50 can have a corresponding slot (not shown). An energy store in the form of a helical spring 52 is arranged between the longitudinal bar 42 and the axle of the roller 48 in such a way that it pushes the roller 48 against the first shaft wall 18, so that the roller 48 and thus the support component 44 is in contact with or supported against the first shaft wall 18 via a support surface 54.

A stabilizing element 6 is also arranged at the lower end of the longitudinal bar 42 toward the first shaft wall 18. The stabilizing element 6 has a roller 7 which is pressed against the first shaft wall 18 by the longitudinal bar 42 via an energy store in the form of a spring 8. When the mounting frame 24 is displaced in the elevator shaft 16, the roller 7 of the stabilizing element 6 rolls against the first shaft wall 18. The stabilizing element 6 also has a fixing element in the form of a pneumatic brake 9, which can be supplied with compressed air and thus activated via a compressed air line (not shown). In the activated state, the pneumatic brake 9 fixes the roller 7 relative to the longitudinal bar 42 and thus relative to the main frame 30. In the state of the mounting device 24 shown in FIGS. 1 and 2, in which it can be displaced in the elevator shaft 16, the pneumatic brake 9 is not activated, so that the roller 7 can be displaced toward the longitudinal bar 42 against the force of the spring 8.

A secondary fixing component 56 is arranged on the middle part 32 of the main frame 30 toward the second shaft wall 20. An actuating bolt 58 extending in the fixing direction 40 is mounted in the middle part 32 and protrudes from the middle part 32 toward the second shaft wall 20. The actuating bolt 58 can be displaced, i.e. extended out of the middle part 32 and retracted into the middle part 32, in the fixing direction 40 by means of two actuators in the form of an electric spindle drive 60. The actuating bolt 58 is connected via an intermediate piece 62, which also extends in the fixing direction 40, to a contact element 64 which is elongate in the displacement direction 27. The actuating bolt 58 is inserted into the intermediate piece 62 and can be secured in various positions relative to the intermediate piece 62 with a bolt (not shown). In this way, a spacing between the contact part 64 and the middle part 32 and thus the main frame 30 in the fixing direction 40 can also be changed independently of the spindle drives 60 of the secondary fixing component 56.

The contact part 64 is multi-part. A middle piece 66 is securely connected to the intermediate piece 62. The middle piece 66 is adjoined in the displacement direction 27 at the top and bottom by an end piece 68 that can be easily mounted and dismounted.

In FIGS. 1 and 2, the four support components 44 are in the displacement position. The rollers 48 protrude beyond the primary fixing components 46 toward the first shaft wall 18. The support surfaces 54 on the rollers 48 are thus arranged further outward in the fixing direction 40, i.e. toward the first shaft wall 18, from the main frame 30 than the entire primary fixing component 46. In addition, the contact part 64 of the secondary fixing component 56 is in the displacement position. The contact part 64 is therefore not in contact with the second shaft wall 20; rather, it is at a spacing from the second shaft wall 20 in the fixing direction 40.

In this state of the mounting frame 24 and thus the mounting device 26, the frame can be displaced in the displacement direction 27 in the elevator shaft 16 by means of the winch 12 and the cable 22 and thus positioned at different heights. The mounting frame 24 is supported against the first shaft wall 18 via the support surfaces 54 of the rollers 48. The rollers 48 roll on the first shaft wall 18.

In order to fix the mounting frame 24 and thus the mounting device 26 in the elevator shaft 16, the contact part 64 of the secondary fixing component 56 is displaced outward, i.e. away from the main frame 30, by means of the two spindle drives 60 toward the second shaft wall 20. As long as the contact part 64 has not reached the second shaft wall 20, the support elements 44 remain in the displacement position shown in FIGS. 1 and 2. When the contact part 64 is in contact with the second shaft wall 20 and the actuating bolt 58 is extended further from the middle part 32, the entire main frame 30, together with all the parts arranged thereon so as to be immovable, is displaced toward the first shaft wall 18. The helical springs 52 of the support elements 44 are then compressed until the primary fixing components 46 rest against the first shaft wall 18 via fixing surfaces 74 (see FIG. 3). The mounting frame 24 is thus secured or braced, and thus fixed, between the first shaft wall 18 and the second shaft wall 20.

When the mounting frame 24 is fixed in the manner described, the roller 7 of the stabilizing element 6 is also displaced against the force of the spring 8 toward the longitudinal bar 42 and thus toward the main frame 30.

Figure 3:
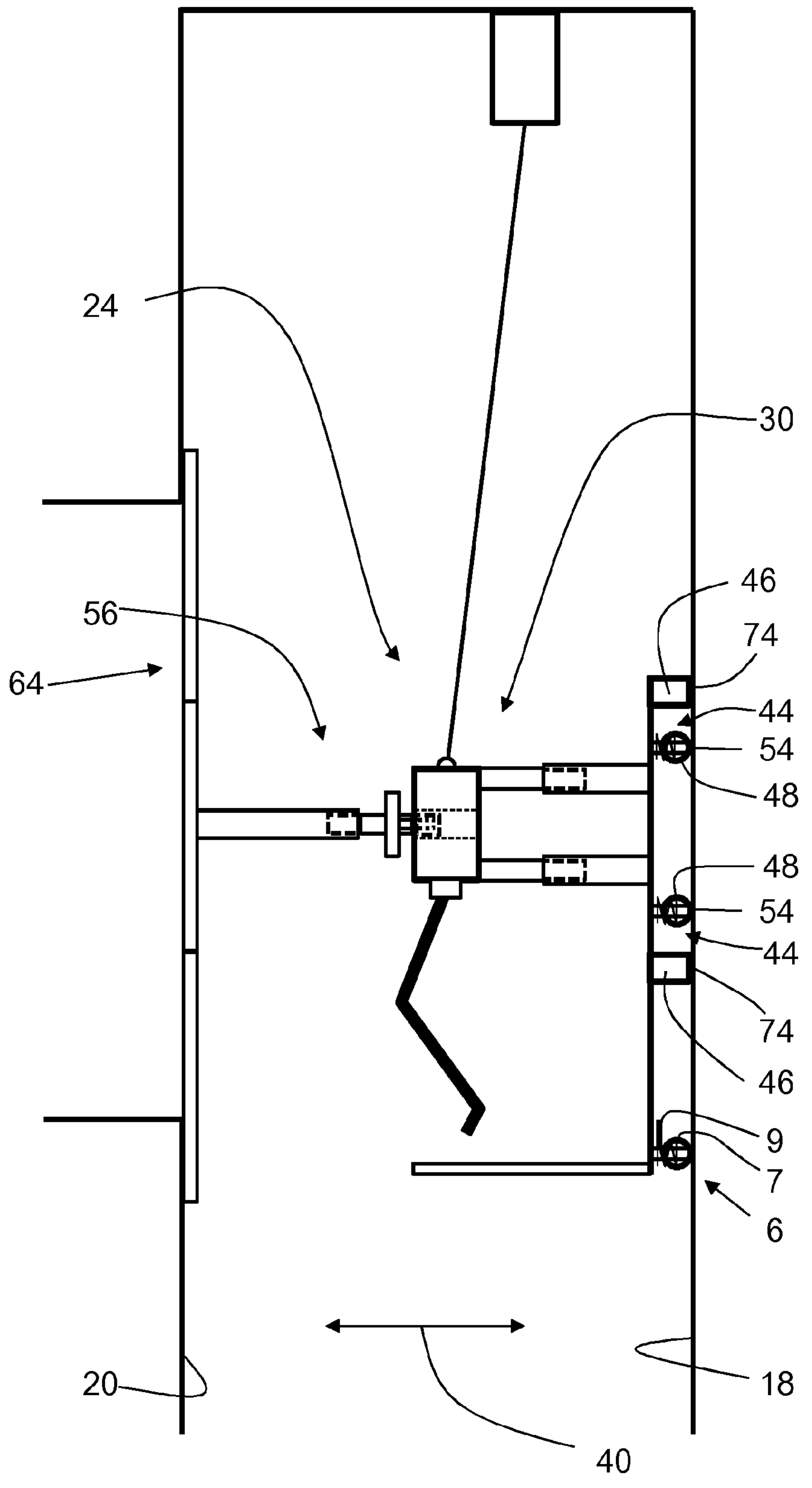
FIG. 3 shows the mounting system from FIG. 1 having the mounting frame with the support component in a fixing position and the contact part of the secondary fixing component in a fixing position in a side view.

In FIG. 3, the mounting frame 24 is shown in the fixed state. The contact part 64 of the secondary fixing component 56 is in its fixing position here, in which it is in contact with the second shaft wall 20 and is thus spaced further outward from the main frame 30 toward the second shaft wall 20 than in the displacement position. In addition, the support components 44 are in their fixing position, in which no part of the support surfaces 54 is spaced further outward in the fixing direction 40, i.e. toward the first shaft wall 18, from the main frame 30 than the fixing surfaces 74 of the primary fixing components 46. Since the rollers 48 are also in contact with the first shaft wall 18 in this state, the support surfaces 54 and the fixing surfaces 74 are spaced outward in the fixing direction 40 from the main frame 30 by the same amount.

When the mounting frame 24 is in the fixed state, the pneumatic brake 9 of the stabilizing element 6 is also activated by applying compressed air. The roller 7 is thus fixed relative to the longitudinal bar 42 and thus relative to the main frame 30 so that it can no longer be displaced any further toward the longitudinal bar 42. Forces acting on the longitudinal bar 42 toward the first shaft wall 18 can thus be supported against the first shaft wall 18 via the roller 7 of the stabilizing element 6. It is also possible for the pneumatic brake 9 of the stabilizing element 6 to be activated only when the mounting frame 24 is actually used for mounting work in the elevator shaft 16.

Finally, it should be noted that terms such as "having," "comprising," etc. do not preclude other elements or steps and terms such as "a" or "an" do not preclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A mounting frame for displacing and fixing in a shaft, the mounting frame comprising a main frame;

a support component having a support surface for supporting the mounting frame against a first shaft wall of a shaft when the mounting frame is displaced in a displacement direction in the shaft;

a primary fixing component having a fixing surface for supporting the mounting frame against the first shaft wall when the mounting frame is fixed in the shaft;

a secondary fixing component having a contact part for supporting the mounting frame against a second shaft wall of the shaft, the second wall being opposite the first shaft wall in a fixing direction, when the mounting frame is fixed in the shaft;

wherein the support component and the primary fixing component are arranged on a first side of the main frame, and the secondary fixing component is arranged on a second side of the main frame, the second side being opposite the first side in the fixing direction;

wherein the primary fixing component is arranged on the main frame and is immovable relative to the main frame;

wherein the contact part of the secondary fixing component is arranged on the main frame and is movable in the fixing direction relative to the main frame between a fixing position and a displacement position, the contact part being spaced further outward in the fixing direction from the main frame in the fixing position than when in the displacement position; and wherein the support component is arranged on the main frame and is at least partially movable in the fixing direction relative to the main frame between another fixing position and another displacement position, wherein no part of the support surface is spaced further outward in the fixing direction from the main frame in the another fixing position than the fixing surface of the primary fixing component, and the support surface is spaced further outward in the fixing direction from the main frame in the another displacement position than the fixing surface.

2. The mounting frame according to claim 1 including an energy store arranged to push the support component toward the another displacement position.

3. The mounting frame according to claim 1 wherein the main frame is multi-part including two parts movable relative to one another in the fixing direction.

4. The mounting frame according to claim 1 including a suspension device on the main frame for suspending the mounting frame on a carrier means and wherein the suspension device is movable in the fixing direction.

5. The mounting frame according to claim 1 wherein the mounting frame has two of the support component and two of the primary fixing component that are arranged spaced apart from one another in the displacement direction, the primary fixing components being arranged on an outside in the displacement direction relative to the support components.

6. The mounting frame according to claim 1 including a stabilizing element arranged on the first side of the main frame for supporting the main frame against the first shaft wall in the fixing position of the support component.

7. The mounting frame according to claim 6 wherein the main frame has a longitudinal beam extending in the displacement direction and the stabilizing element is arranged on the longitudinal beam.

8. The mounting frame according to claim 6 wherein the stabilizing element includes a roller that is pushed away from the main frame toward the first shaft wall by an energy store, and a controllable fixing element for fixing the roller in a position relative to the main frame.

9. The mounting frame according to claim 1 wherein the contact part of the secondary fixing component has a shape that is elongate in the displacement direction.

10. The mounting frame according to claim 9 wherein the contact part of the secondary fixing component is multi-part.

11. The mounting frame according to claim 1 wherein the secondary fixing component has an actuator by which the contact part is movable between the fixing position and the displacement position, and the secondary fixing component is adapted such that a spacing between the contact part and the main frame in the fixing direction can be changed independently of the actuator of the secondary fixing component.

12. A mounting device for carrying out automated mounting steps in a shaft, the mounting device comprising:

the mounting frame according to claim 1; and a mechatronic installation component arranged on the mounting frame.

13. A mounting system for carrying out automated mounting steps in a shaft, the mounting system comprising:

the mounting device according to claim 12; and a displacement component connected to the mounting device for displacing the mounting device in the shaft.

* * * * *